United States Patent
Kollu

(10) Patent No.: US 10,223,314 B2
(45) Date of Patent: Mar. 5, 2019

(54) PCI EXPRESS CONNECTED NETWORK SWITCH

(71) Applicant: Brocade Communications Systems, Inc., San Jose, CA (US)

(72) Inventor: Badrinath Kollu, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 241 days.

(21) Appl. No.: 15/238,470

(22) Filed: Aug. 16, 2016

(65) Prior Publication Data
US 2017/0052916 A1    Feb. 23, 2017

Related U.S. Application Data

(60) Provisional application No. 62/206,149, filed on Aug. 17, 2015.

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 7,554,997 B1 * | 6/2009 | Schlichter | ........... | H04L 12/2856 370/402 |
| 8,614,946 B1 * | 12/2013 | Noble | .................... | H04L 43/026 370/230.1 |
| 9,025,495 B1 | 5/2015 | Brown et al. | | |
| 9,146,890 B1 | 9/2015 | Brown et al. | | |
| 2008/0239945 A1 | 10/2008 | Gregg | | |
| 2010/0214950 A1 | 8/2010 | Vobbilisetty | | |
| 2013/0235870 A1 * | 9/2013 | Tripathi | .............. | H04L 41/5019 370/390 |
| 2014/0059265 A1 * | 2/2014 | Iyer | ........................ | G06F 9/5011 710/313 |

(Continued)

OTHER PUBLICATIONS

PCT Int'l Search Report & Written Opinion filed in copending PCT Application No. PCT/US16/47200 dated Oct. 24, 2016, 9 pages.

*Primary Examiner* — Hyun Nam
(74) *Attorney, Agent, or Firm* — Blank Rome, LLP

(57) ABSTRACT

A host connected to a switch using a PCI Express (PCIe) link. At the switch, the packets are received and routed as appropriate and provided to a conventional switch network port for egress. The conventional networking hardware on the host is substantially moved to the port at the switch, with various software portions retained as a driver on the host. This saves cost and space and reduces latency significantly. As networking protocols have multiple threads or flows, these flows can correlate to PCIe queues, easing QoS handling. The data provided over the PCIe link is essentially just the payload of the packet, so sending the packet from the switch as a different protocol just requires doing the protocol specific wrapping. In some embodiments, this use of different protocols can be done dynamically, allowing the bandwidth of the PCIe link to be shared between various protocols.

18 Claims, 12 Drawing Sheets

(56) References Cited

U.S. PATENT DOCUMENTS

| | | | |
|---|---|---|---|
| 2014/0181354 A1* | 6/2014 | Yi | G06F 13/4022 |
| | | | 710/313 |
| 2014/0281062 A1* | 9/2014 | Harriman | G06F 13/423 |
| | | | 710/61 |
| 2014/0289444 A1 | 9/2014 | Kuramoto | |
| 2014/0351654 A1 | 11/2014 | Zhang et al. | |

* cited by examiner

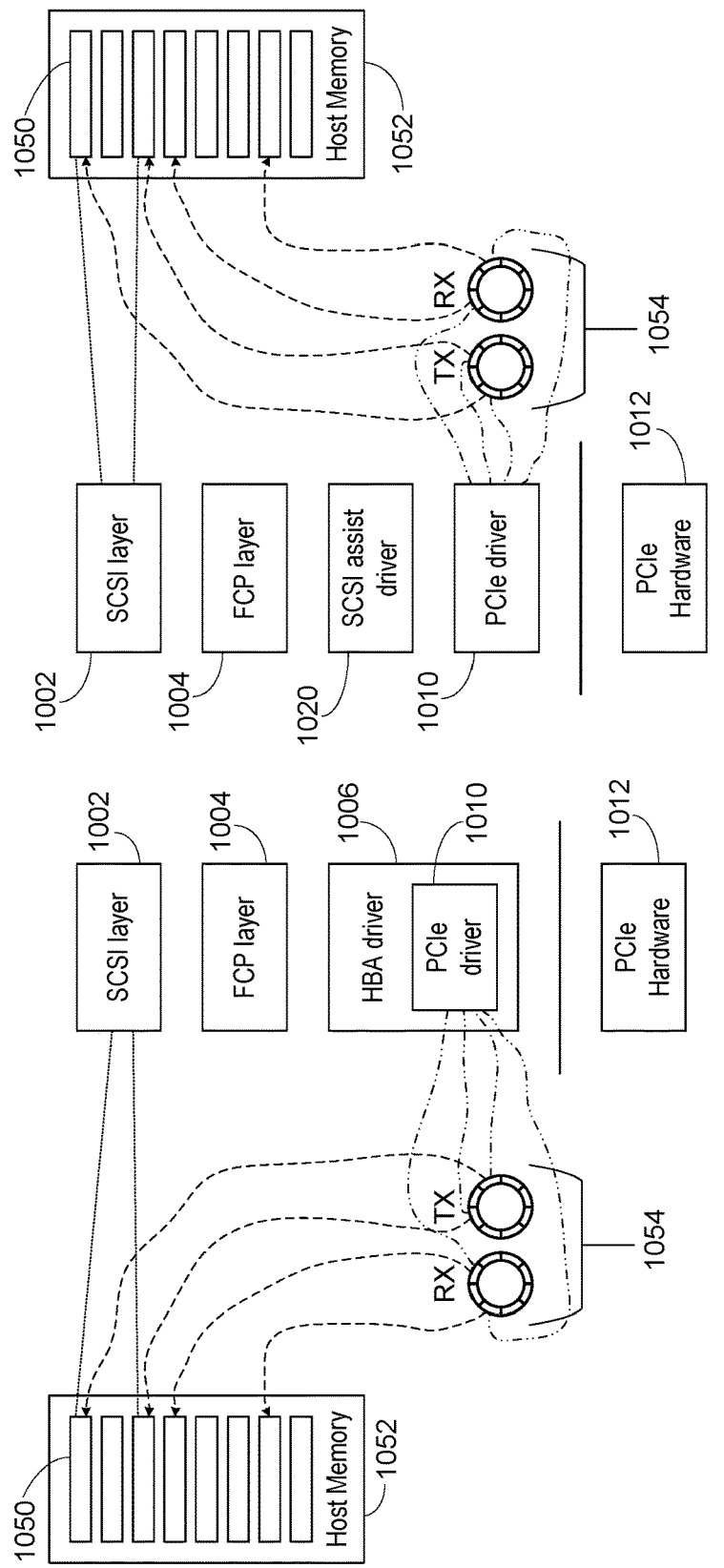

| PCIe | Fibre Channel | Ethernet |
|---|---|---|
| Address | SID, DID, OXID, RXID, R_CTL Type, TYPE, VC, Completer ID | SMAC, DMAC, VLAN, Ethertype, Completer ID |
| Requestor ID | Requestor ID | Requestor ID |
| Tag | Tag | Tag |
| TC | CS_CTL | COS |

Fig. 11

PCI EXPRESS CONNECTED NETWORK SWITCH

CROSS REFERENCE TO RELATED APPLICATIONS

This application claims the benefit under 35 U.S.C. § 119(e) of U.S. Provisional Patent Application Ser. No. 62/206,149, entitled "PCI Express Connected Network Switch," filed Aug. 17, 2015, which is hereby incorporated by reference.

BACKGROUND OF THE INVENTION

1. Field of the Invention

The invention relates to networking.

2. Description of the Related Art

As networks grow every larger and more complicated, delays are induced in more locations and more physical hardware is required, which has costs in terms of both money and space. It would be desirable to reduce cost, space and delays in a network.

Server development has been enhanced by the inclusion of Peripheral Component Interconnect Express (PCIe) links inside the server. As shown in FIG. 1, a modern processor 100 may include several PCIe root complexes. Memory 102 is directly connected to the processor 100. A series of PCIe devices 104 can be directly connected to the processor 100 or to a PCIe fabric switch 106, which is connected to the processor 100. The PCIe devices 104 can be of various functions, such as storage controllers for direct attached storage, network interface controllers (NICs) for Ethernet connections to a local area network (LAN), host bus adapters (HBAs) for Fibre Channel (FC) connections to a storage area network (SAN) and host channel adapters (HCAs) for InfiniBand connections for clustering.

There have been efforts to use PCIe as a cluster interconnect, as shown in FIG. 2. Each server or host 200 is connected to an edge PCIe fabric switch 204. A layer of core PCIe fabric switches 206 then links together the edge PCIe fabric switches 204. Shared I/O 202, such as storage, NICs or HBAs, is also connected to an edge PCIe fabric switch 204, which are connected to the core PCIe fabric switches 206. This configuration allows very high speed, very low overhead communication between the hosts 200 in the cluster and high speed access to the shared I/O 202.

FIG. 3 illustrates proposed rack scale use of PCIe interconnects. This is a variant on the cluster interconnect of FIG. 2, just configured for use in normal data center racks. A series of host chassis 302, such as 1 U high chassis for higher density, are used to provide the basic processing capability. A host chassis 302 includes a host 304, primarily the processor 100 and memory 102, and a PCIe retimer 306. As the PCIe links will be longer than if located entirely on a normal motherboard, retiming is necessary. A storage chassis 308 includes a storage controller 310, typically a RAID controller; a storage array 312, an array of hard drives to provide bulk storage; and a PCIe retimer 306. The storage chassis 308 provides a direct attached bulk storage function. A flash chassis 314 includes a series of solid-state disk (SSD) controllers 316, which are connected to an array of flash memory devices 318. The SSD controllers 316 are connected to a PCIe bridge 320 as illustrated as the exemplary SSD controllers 316 are not PCIe compatible. If the SSD controllers were PCIe compatible, then PCIe retimers could have been used. The flash chassis 314 provides high speed, non-volatile storage for use by the processors 100, often in online transaction processing (OLTP) applications. A graphics processing unit (GPU) chassis 322 includes an array of GPUs 324, which can be used for high speed array and vector processing, for example. The GPUs 324 are connected to a PCIe bridge 326. At the top of the rack (TOR) is an interconnect chassis 328. The illustrated interconnect chassis 328 includes one HBA 330 and two NICs 332. The HBA 330 is connected to a SAN fabric 334, to which conventional external storage 336 is connected. The NICs 332 are connected to a LAN 338 to provide general Ethernet connectivity, for example to the Internet. A PCIe fabric switch 340 connects to the HBA 330 and NICS 332 in the interconnect chassis 328 and to the PCIe retimers 306 and PCIe bridges 320 and 326 to provide overall interconnection of the various chassis to provide a complete computer system.

While the rack configuration of FIG. 3 is an advance over using a series of individual hosts, each having processor, memory, storage, HBA and NIC, with TOR switches for the SAN and LAN, it is really nothing more than an exploded and reconfigured host, with all of the attendant delays and slowdowns associated with a typical server. Thus, while it is an improvement, there are still many delays present in interconnecting with other devices.

SUMMARY OF THE INVENTION

In networks according to the present invention, preferred embodiments have a host connected to a switch using a PCI Express (PCIe) link. At the switch, the packets are received and routed or switched as appropriate and provided to a conventional switch network port for egress from the switch and transmission into conventional LANs and SANs.

According to the present invention, the hardware from the HBA or NIC that is required to convert from the packets on the PCIe link to FC or Ethernet packets is moved to the port at the switch, with various software portions retained as a driver on the host. This allows the HBA or NIC to be completely removed from the host, saving both cost and space. This space saving can be used to provide additional processors and memory in the freed up space, further increasing compute density, which is very desirable in cloud and datacenter applications. The hardware cost of the switch may increase due to the additional functions but this is much less of an impact on the overall system as the switch is often formed using a very high density ASIC or the like, so the actual cost increase is smaller.

Removing the HBA or NIC can usually be accompanied by removing any PCIe switch present on the host board that had been used for PCIe fanout. Current server or host processors include multiple PCIe root complexes, so redundancy can be maintained by using different root complexes instead of redundant HBAs or NICs, further improving the cost and space savings.

Removing both the PCIe switch and the HBA or NIC reduces latency significantly. The inclusion of the HBA or NIC functions in the switch ASIC adds back much less latency than present in the HBA or NIC due to improved speed and density.

There are numerous advantages of directly accessing the typical PCIe queue structure for the host to switch link. As protocols like FC or Ethernet often have multiple threads or flows, these flows can correlate to PCIe queues, thus requiring reduced effort to develop the flows and easier QoS handling as it is done based on the PCIe queue rather than new queues developed in the switch or the HBA/NIC.

Mapping to an RDMA environment is also greatly simplified as the PCIe queues are structures located in host memory, thus providing a direct correspondence to RDMA operation. Indeed, as the PCIe queues are just memory structures, a network service could be provided directly to the operating system, so that the normally used buffers are equated to the PCIe queues and much of the software stack can be avoided.

In modern hosts, there are often numerous virtual machines (VMs) and a hypervisor. The hypervisor includes a virtual switch. As the virtual switch is based on the use of buffers in memory, this cooperates nicely with PCIe queues, so that the virtual switch can be easily integrated into the physical switch by configuring the queues, and even potentially be replaced in many cases. As the physical switch has hardware routing capabilities in the switch ASIC, this hardware routing, which is much faster than the routing operations in the virtual switch, can be used to assist the hypervisor in its virtual switch operations.

In most cases the NIC/HBA/HCA operate as a bottleneck because they cannot handle traffic at the full PCIe rate and the interconnects also generally cannot handle the full PCIe rate, at least not affordably. For example, PCIe 3.0 has a maximum bandwidth of over 100 Gbs for a 16 lane link and PCIe 4.0 will double that to approximately 250 Gbs for a 16 lane link. The PCIe 3.0 rate matches the maximum FC rates that are just becoming available today, exceeds all affordable Ethernet rates and matches the highest available InfiniBand rates and yet is present in every server class processor. Removing the interface card improves performance by removing a bottleneck.

The use of the PCIe link to the switch allows much easier multi-protocol operations at the switch. As effectively just raw data is being provided to the switch, with no significant inclusion of protocol elements, it is very easy for the switch to deliver the data in whatever protocol is desired. The data provided over the PCIe link is essentially just the payload of the packet, so sending the packet from the switch as Ethernet, FC, InfiniBand, etc. just requires doing the protocol specific wrapping, not any conversion from one protocol to another. This allows the switch to be connected to many different protocols as desired, with just firmware changes between the protocols and some configuration of hardware assist functions. In some embodiments, this use of different protocols can be done dynamically, allowing the bandwidth of the PCIe link to be shared between various protocols. This dynamic use also allows the removal of all adapters, such as HBAs, NICs and HCAs, providing an even greater space savings. Additionally, the higher available bandwidth makes the use of multiple protocols more practical.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIG. 10A is a software stack of a host according to the prior art.

FIG. 10B is a first embodiment of a software stack of a host according to the present invention.

FIG. 11 is a context table according to the present invention.

DETAILED DESCRIPTION OF THE PREFERRED EMBODIMENTS

Figure 1:
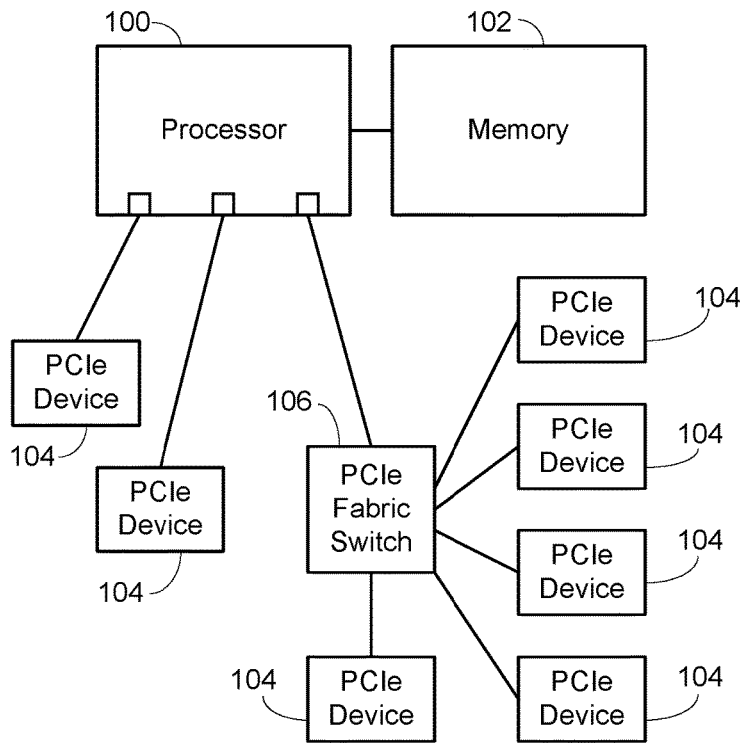
FIG. 1 is a block diagram of a host according to the prior art.
Figure 2:
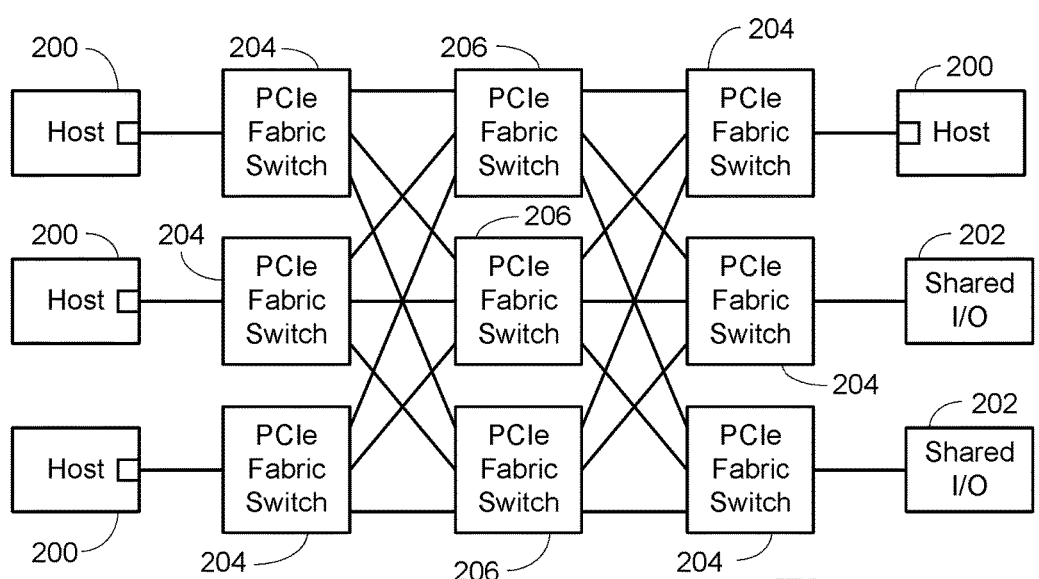
FIG. 2 is a block diagram of a cluster according to the prior art.
Figure 3:
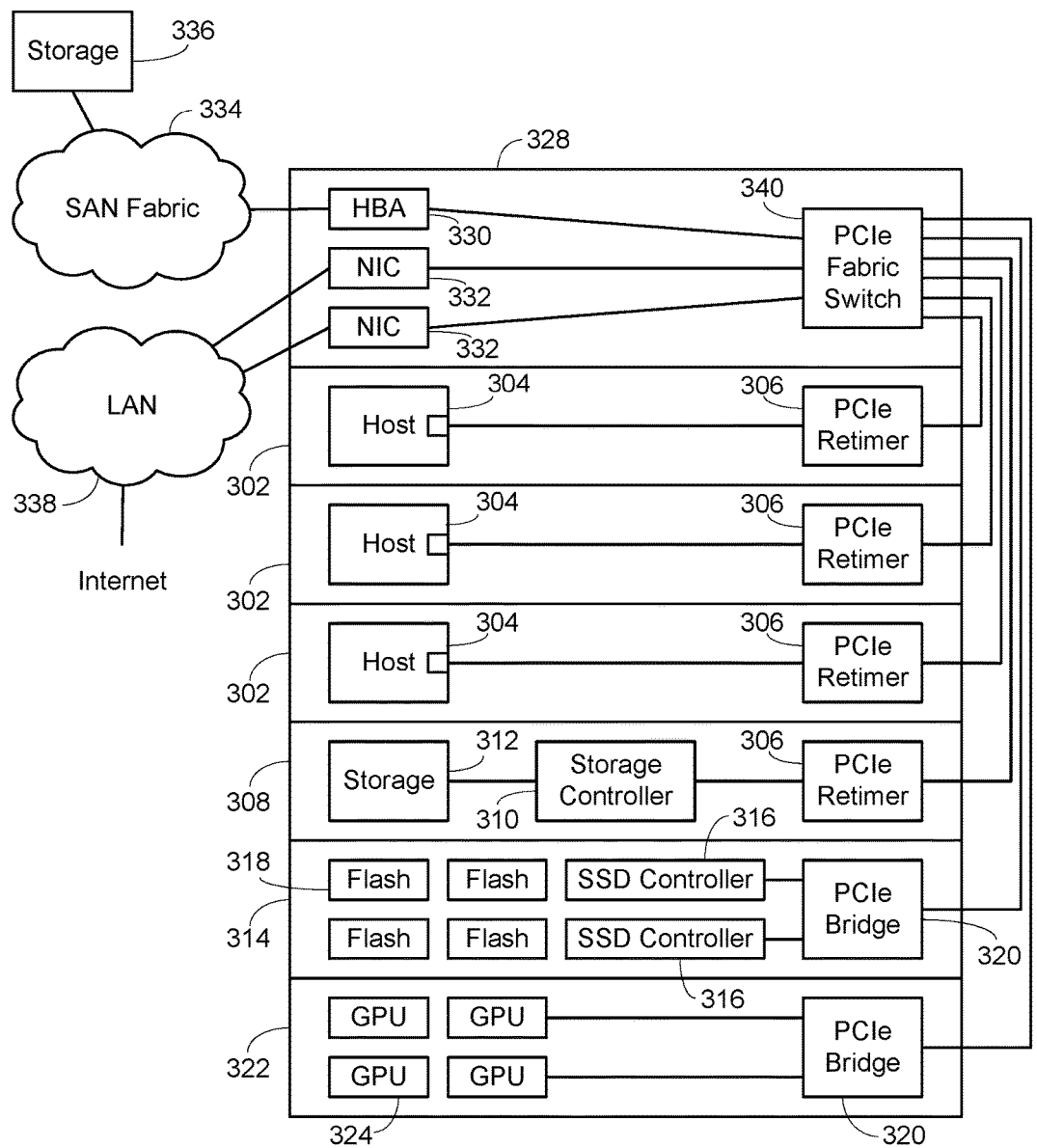
FIG. 3 is a block diagram of a PCIe-connected rack for a data center according to the prior art.
Figure 4:
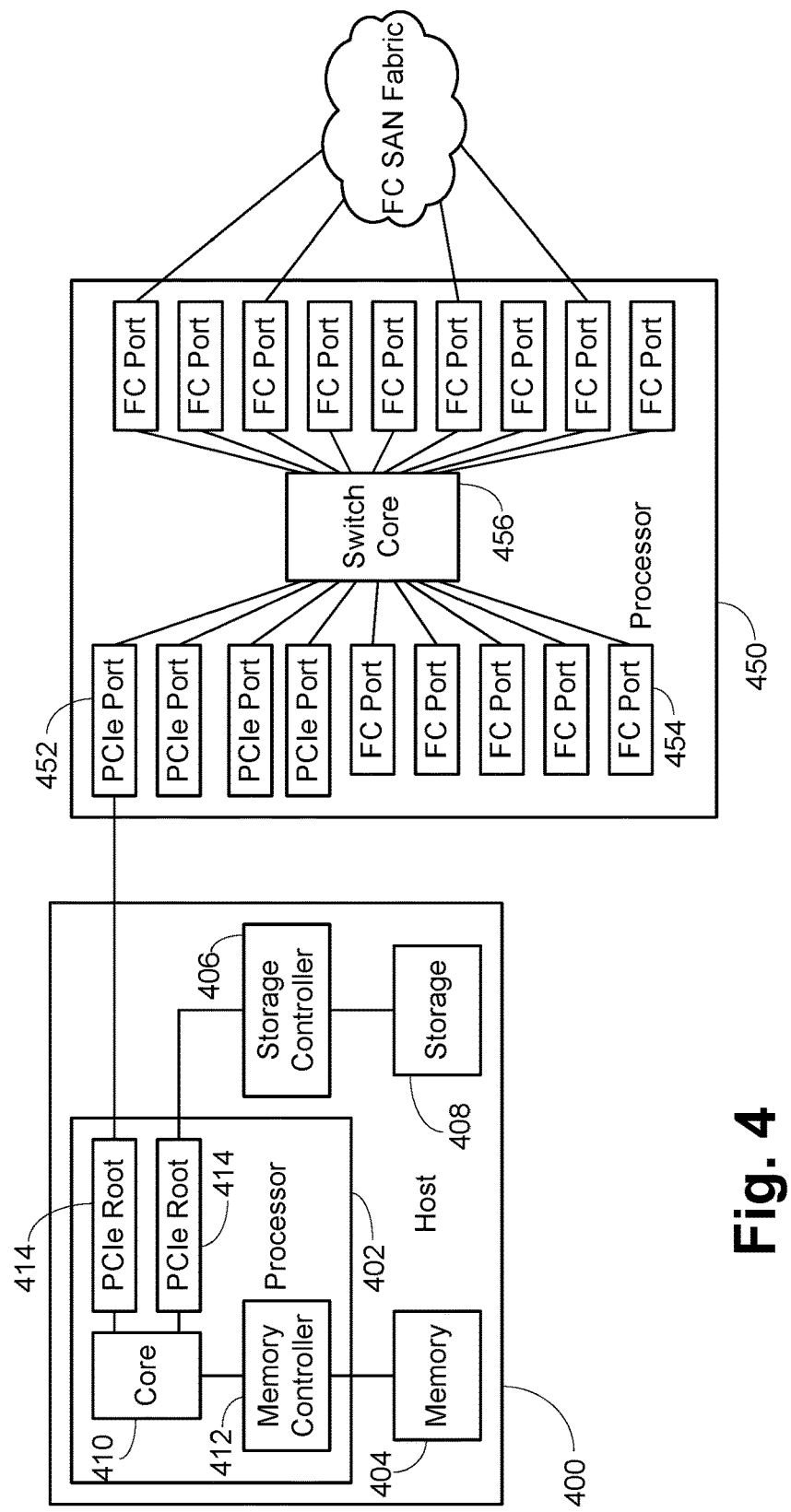
FIG. 4 is a block diagram of a host and a switch according to the present invention.

Referring to FIG. 4, a host 400 includes a processor 402, memory 404, a storage controller 406 and storage 408, though it is understood that the storage controller 406 and storage 408 could be omitted if the host 400 was booting from a network location. Storage 408 holds an operating system and programs used by the processor 402 to have the host 400 provide the desired functions. As this discussion is focused on network packets, at least one application stored in storage 408 will perform read and write operations to a remote device over a networking link. The processor 402 includes at least one core 410, a memory controller 412 and two PCIe roots 414, as shown. It is understood that more or fewer PCIe roots 414 could be present, though at least one is used according to the present invention.

A switch 450 includes a plurality of PCIe ports 452 according to the present invention, a plurality of FC ports 454 and a switch core 456. It is understood that the FC ports 454 could be Ethernet ports, InfiniBand ports, etc. A PCIe port 454 is connected to a PCIe root 414 according to the present invention.

Figure 5:
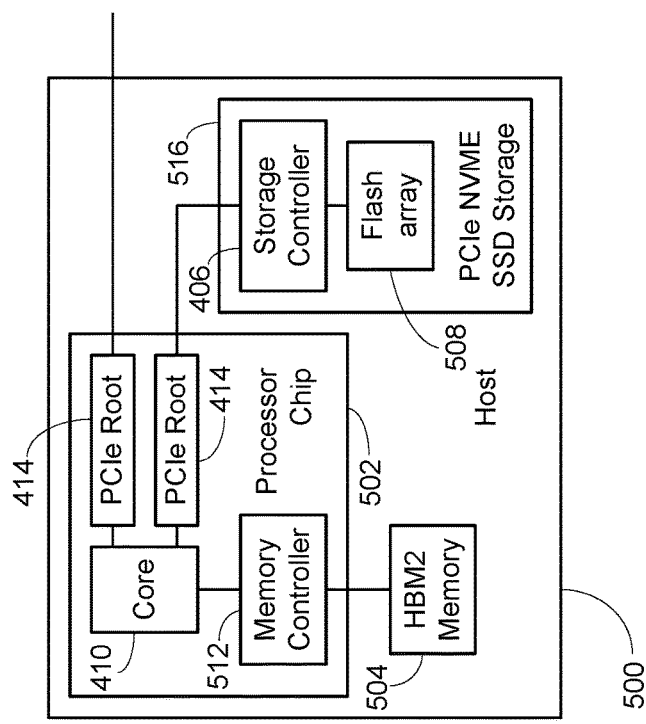
FIG. 5 is a block diagram of an exemplary host according to the present invention.

FIG. 5 illustrates an exemplary version of the host 400 that has been configured for operation according to the present invention. A host 500 contains the processor 502, with its memory controller 512, at least one core 410 and PCIe roots 414. Except for details of the memory controller 512, the processor 502 of FIG. 5 can be the same as the processor 402 of FIG. 4. In the embodiment of FIG. 5, the memory 504 is preferably High Bandwidth Memory (HBM) Version 2 (HBM2) to provide extremely high bandwidth in a very compact configuration. A compact storage device 516 is connected to a PCIe root 414. The compact storage device 516 is preferably a PCIe NVMe (Non-Volatile Memory Express) SSD (solid state storage) device to provide very high performance in a very compact configuration. In this preferred embodiment the host 500 has a size of a normal deck of cards, approximately 2.5" by 3.5".

Figure 6:
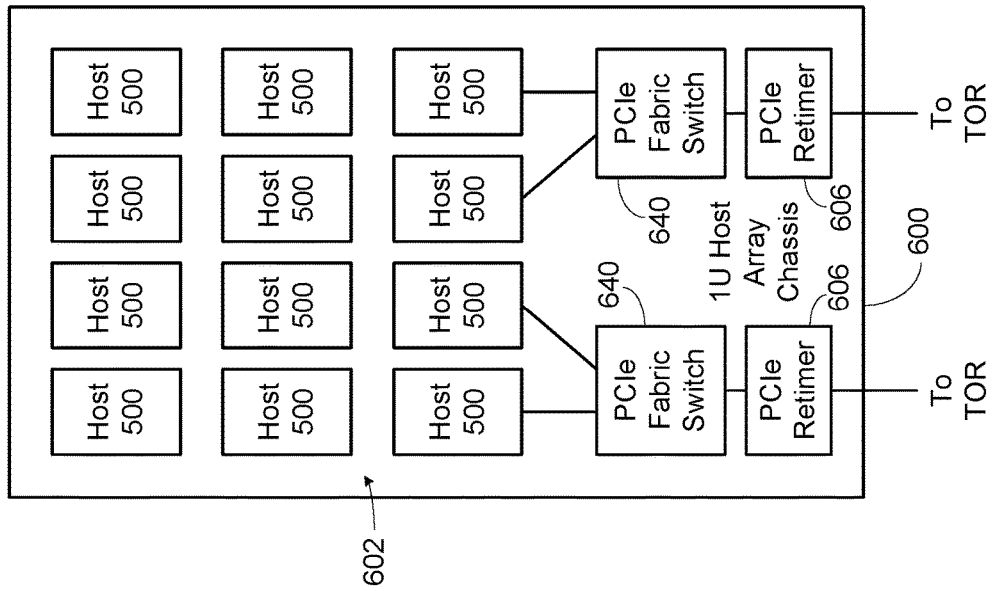
FIG. 6 is a block diagram of a compute chassis according to the present invention.

FIG. 6 is an illustration of 1 U chassis 600 containing an array of hosts 500. In a typical configuration the 1 U chassis 600 would be 1.75" high, 15" wide and 17" deep. A host array 602 of hosts 500 are connected to PCIe fabric switches 640, which are connected to PCIe retimers 606. The PCIe retimers 606 are connected to top-of-rack switch 450.

Figure 7:
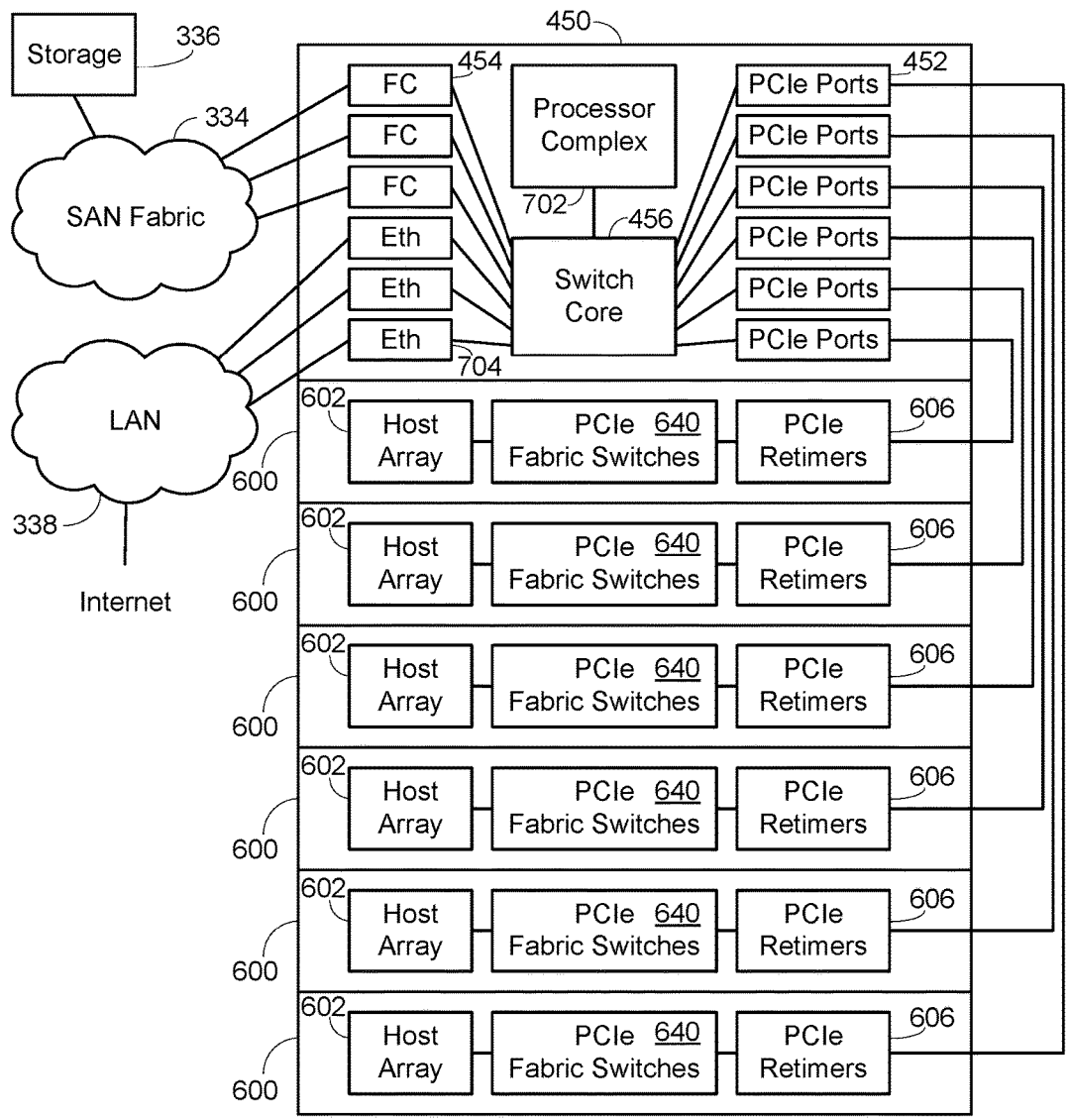
FIG. 7 is a block diagram of a PCIe-connected rack according to the present invention.

As shown in FIG. 7, a series of chassis 600 located in a rack, with a switch 450 located as a top-of-rack switch. The PCIe retimers 606 of the chassis 600 are connected to PCIe ports 452 of the switch 450. The switch 450 of FIG. 7 is configured with both FC 454 and Ethernet 704 ports to allow connection to both the SAN fabric 334 and the LAN 338. A processor complex 702 is connected to the switch core 456 to control the switch core 456 and operations of the PCIe 452, FC 454 and Ethernet 704 ports. The FC 454 and Ethernet 704 ports are conventional and not further explained herein.

Figure 8:
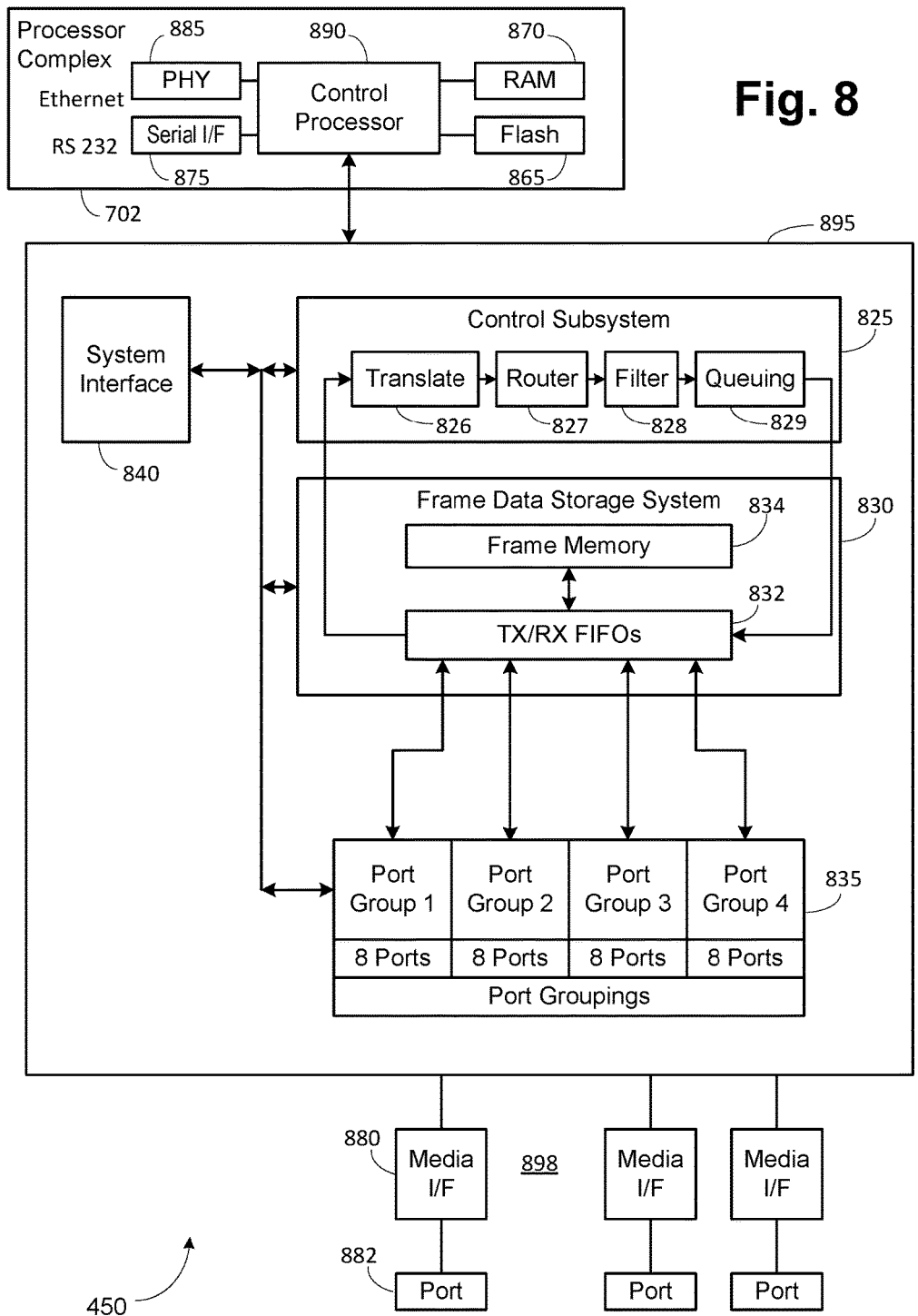
FIG. 8 is a block diagram of a Fibre Channel-based switch according to the present invention.

FIG. 8 is a block diagram of an exemplary switch 450. A control processor 890 on the processor complex 702 is connected to a switch ASIC 895, which operates as the switch core 456. The switch ASIC 895 is connected to media interfaces 880 which are connected to ports 882. Generally, the control processor 890 configures the switch ASIC 895 and handles higher level switch operations, such as the name server, and the like. The switch ASIC 895 handles general high speed inline or in-band operations, such as switching, routing and frame translation. The control processor 890 is connected to flash memory 865 to hold the programs that are used to control the operations of the switch 450 and to operate according to the relevant network protocols, to RAM 870 for working memory and to an Ethernet PHY 885 and serial interface 875 for out-of-band management.

The switch ASIC 895 has four basic modules, port groups 835, a frame data storage system 830, a control subsystem 825 and a system interface 840. The port groups 835 perform the lowest level of packet transmission and reception and are described in more detail below. Generally, frames are received by a port in a port group 835 from a media interface 880 and provided to the frame data storage system 830. Further, frames are received by a port in a port group 835 from the frame data storage system 830 and provided to the media interface 880 for transmission out of port 882. The frame data storage system 830 includes a set of transmit/receive FIFOs 832, which interface with the port groups 835, and a frame memory 834, which stores the received frames and frames to be transmitted. The frame data storage system 830 provides initial portions of each frame, typically the frame header and a payload header for FCP or Ethernet frames, to the control subsystem 825. The control subsystem 825 has the translate 826, router 827, filter 828 and queuing 829 blocks. The translate block 826 examines the frame header and performs any necessary address translations. There can be various embodiments of the translation block 826, with examples of translation operation provided in U.S. Pat. Nos. 7,752,361 and 7,120,728, both of which are incorporated herein by reference in their entirety. Those examples also provide examples of the control/data path splitting of operations. The router block 827 examines the frame header and selects the desired output port for the frame. The filter block 828 examines the frame header, and the payload header in some cases, to determine if the frame should be transmitted. In the preferred embodiment of the present invention, hard zoning is accomplished using the filter block 828. The queuing block 829 schedules the frames for transmission based on various factors including quality of service, priority and the like.

Figure 9:
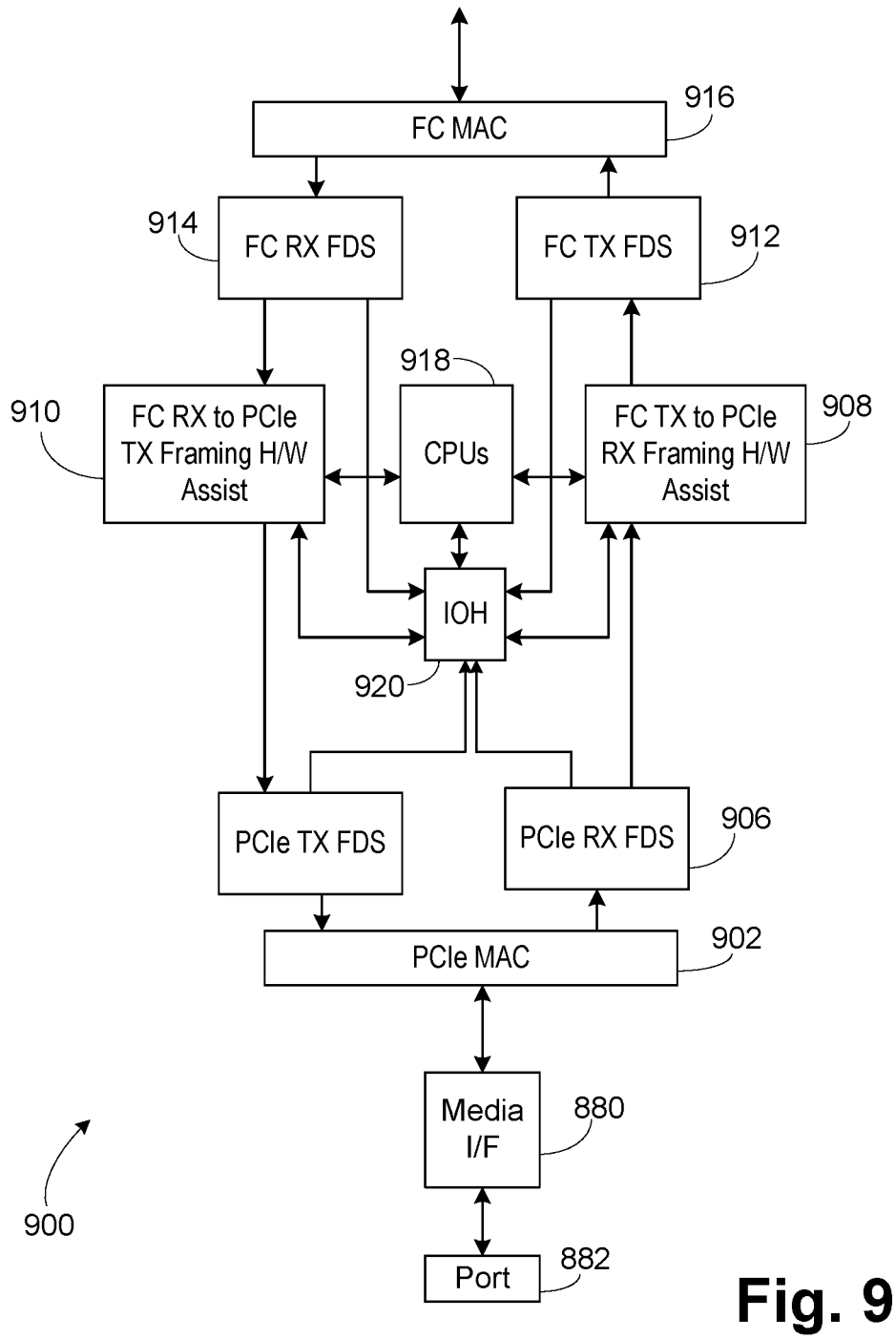
FIG. 9 is a block diagram of a port for the switch of FIG. 8.

FIG. 9 is a detailed block diagram of a PCIe port in a port group 835 according to the present invention. Fibre Channel and Ethernet ports are conventional and not described further herein. The port 882 is connected to a PCIe retimer 606. The media interface 880 is then used if necessary, depending on the distance between the switch 450 and the PCIe retimer 606. Preferably no module is needed in designs such as that of FIG. 7, where the distances involved do not require the use of optical media. The media interface 880 is connected to a PCIe MAC 902, which handles the low level PCIe operations. A PCIe transmit frame data store (FDS) 904 and a PCIe receive FDS 906 are connected to the PCIe MAC 902 to act as buffers in each direction. The PCIe receive FDS 906 is connected to an FC transmit to PCIe receive framing hardware assist block 908. The block 908 provides hardware assist in converting received PCIe packets to FC packets, including handling header removal and addition and the like. Similarly, an FC receive to PCIe transmit framing hardware assist block 910 is connected to the PCIe transmit FDS 904. The block 910 provides hardware assist in converting received FC packets to PCIe packets, including handling header removal and addition and the like. The block 908 is connected to an FC transmit FDS 912, while the block 910 is connected to an FC receive FDS 914. The FC receive FDS 914 and the FC transmit FDS 912 are connected to an FC MAC 916, which in turn is connected to the ASIC 895 frame data storage system 830. In one embodiment, to manage the conversion process CPUs 918 and an IOH (I/O handler) 920 are provided. The IOH 920 maintains the I/O Context Table that holds the context for the various I/Os, both FC and PCIe. The IOH 920 interfaces with FDSs 904, 906, 912 and 914 to monitor queue status and the hardware assist blocks 908, 910 to provide context information for the conversions. The IOH 920 is also connected to the CPUs 918 which provide the overall management and control and which interface with the control processor 890. The CPUs 918 are used for a number of purposes including initialization of the port, setting up and tearing down of the FC and PCIe IOs, handling of exceptions, processing management frames and so on. The firmware for the CPUs 918 is stored in off board flash memory (not shown) and loaded into RAM contained in the CPUs 918 during operation. The programs in the memory are those needed to allow the CPUs 918 to perform the tasks described herein.

The context information is preferably provided by assist software now present on the host. This allows an I/O context table to be setup to include the necessary context information to allow proper conversion between PCIe and FC packets, such as addressing, sequencing and the like, by the hardware assist blocks 908, 910. An exemplary context table is illustrated in FIG. 11. The exemplary context table is for use with both Fibre Channel and Ethernet frames, though in most uses only a single protocol would be present. The PCIe address value is mapped to FC SID, DID, OXID, RXID, R_CTL Type and TYPE, and virtual channel (VC) if desired, values and the PCIe Completer ID. This allows fine grained operations by selecting a given PCIe address and then mapping that value into very specific Fibre Channel flows. An incoming PCIe packet would have its address analyzed and matching SID, DID, OXID, RXID, R_CTL Type, TYPE and VC values are obtained to place into the FC packet header. The PCIe packet payload is the FC packet payload assembled in the buffer in the host, so that only header development is necessary. For an incoming FC packet, a tuple formed by SID, DID and OXID is checked for a mapping to the relevant PCIe Completer ID and that value is provided for inclusion in the PCIe packet header. The PCIe Requestor ID value and Tag value are stored in the state table and then are used to develop the PCIe header for incoming FC packets. The PCIe TC value is stored and mapped CS_CTL bits present in the state table are used in the FC header. Likewise, for incoming FC packets, the CS_CTL value is inspected and the relevant PCIe TC values are used in the PCIe packet header. In an alternate embodiment, the Requestor ID, tag and TC values are all mapped to the PCIe address to provide complete context based on only the PCIe address.

PCIe packet to Ethernet packet mapping is similar, with PCIe address mapping to Ethernet SMAC, DMAC, VLAN and Ethertype values and PCIe TC mapping to Ethernet COS. As with the Fibre Channel embodiment, a given PCIe address is used for an Ethernet flow. In the preferred switch embodiment, all internal switching is performed using Fibre Channel or Fibre Channel equivalent packets, in which case the necessary FC information is also stored in the Ethernet context entries. This additional FC information may be obtained by the CPUs 918 from the control processor 890, which maintains the necessary Ethernet to FC context information.

The above discussion has used FC as an exemplary protocol for the switch 450, but it is understood that the switch 450 could be used for Ethernet, InfiniBand and other protocols as desired by changing the hardware assist blocks, the relevant MAC and the firmware for the CPUs 918. If the hardware assist blocks are properly programmable or are sufficiently small to allow all desired protocol hardware assist blocks to be present, multiple protocols can used in or for a single switch 450. Indeed, in one embodiment the actual protocol used is also based on the PCIe address. A first address can be classified for FC packets in the context setup while a second address can be classified for Ethernet packets in the context setup. When a PCIe packet is received, the context table also indicates the protocol and the proper hardware assist is used. This allows removal of both the HBA and the NIC from the host, with resultant size, heat and cost savings. Further, providing multiple protocols over the single PCIe link makes better use of the PCIe link bandwidth, which in most cases would not be fully utilized by just a single protocol. For example, providing the packets equivalent to a 32 GB/s HBA and a 25 Gb/s NIC makes better use of the 100 GB/s bandwidth of PCIe 3.0 than either alone. If the replaced HBA is a 16 GB/s HBA and the replaced NIC is a 10 GbE NIC, then the use of the PCIe link provides much greater bandwidth than was previously available by removing the existing bottlenecks of the 16 GB/s HBA and 10 GB/S NIC.

The context information for the context table is preferably provided inband using PCIe messages. The CPUs 918 receive these PCIe messages and properly place the data into the context tables. The CPUs 918 also receive completion, context table miss (new incoming FC flow for example) and error indications from the FDSs, the IOH and the assist modules and either handle them locally or forward them to the host for handling by the host CPU. Commands to remove a given entry from the context table are also preferably provided in PCIe messages.

In an alternate embodiment, the assist modules 908, 910 and the IOH 920 are configured to directly receive the context information provided in the PCIe messages and install the context information into the context tables. In this case the CPUs 918 are not needed, particularly if the completion, context table miss and error indications are provided to the host CPU automatically as PCIe messages. This reduces the amount of ASIC space needed in the switch, allowing the switch ASIC to be smaller and thus cheaper or allowing additional functionality to be placed in the switch ASIC.

In either embodiment the PCIe configuration space can be used to set up this portion of the switch ASIC.

The port logic of FIG. 9 is generally much smaller than an equivalent port processor of an Ethernet port and of similar complexity to a FC port front end. Therefore, the port logic does not appreciably add to the cost of the switch 450.

Figure 12A:
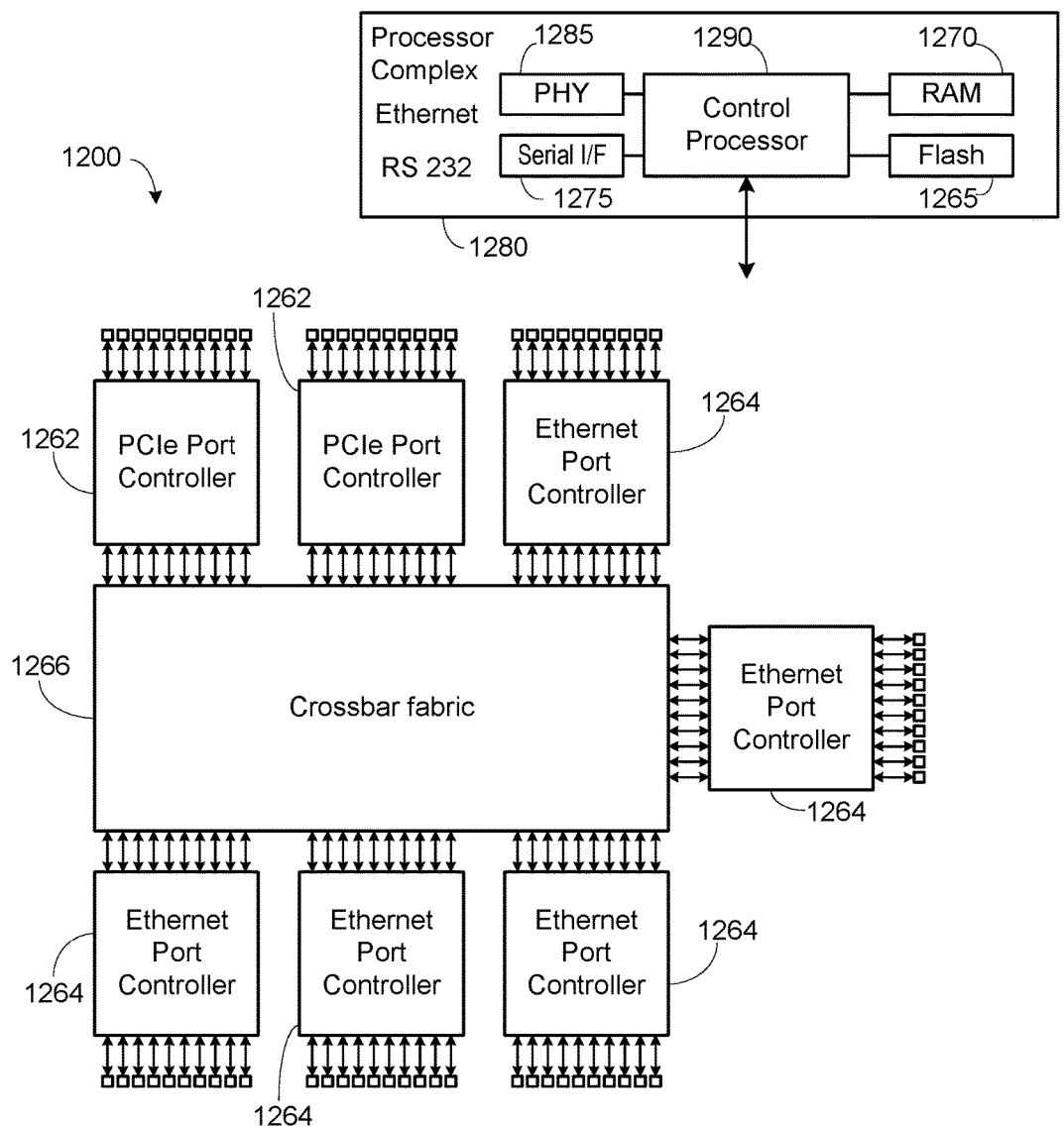
FIG. 12A is a block diagram of an Ethernet-based switch according to the present invention.
Figure 12B:
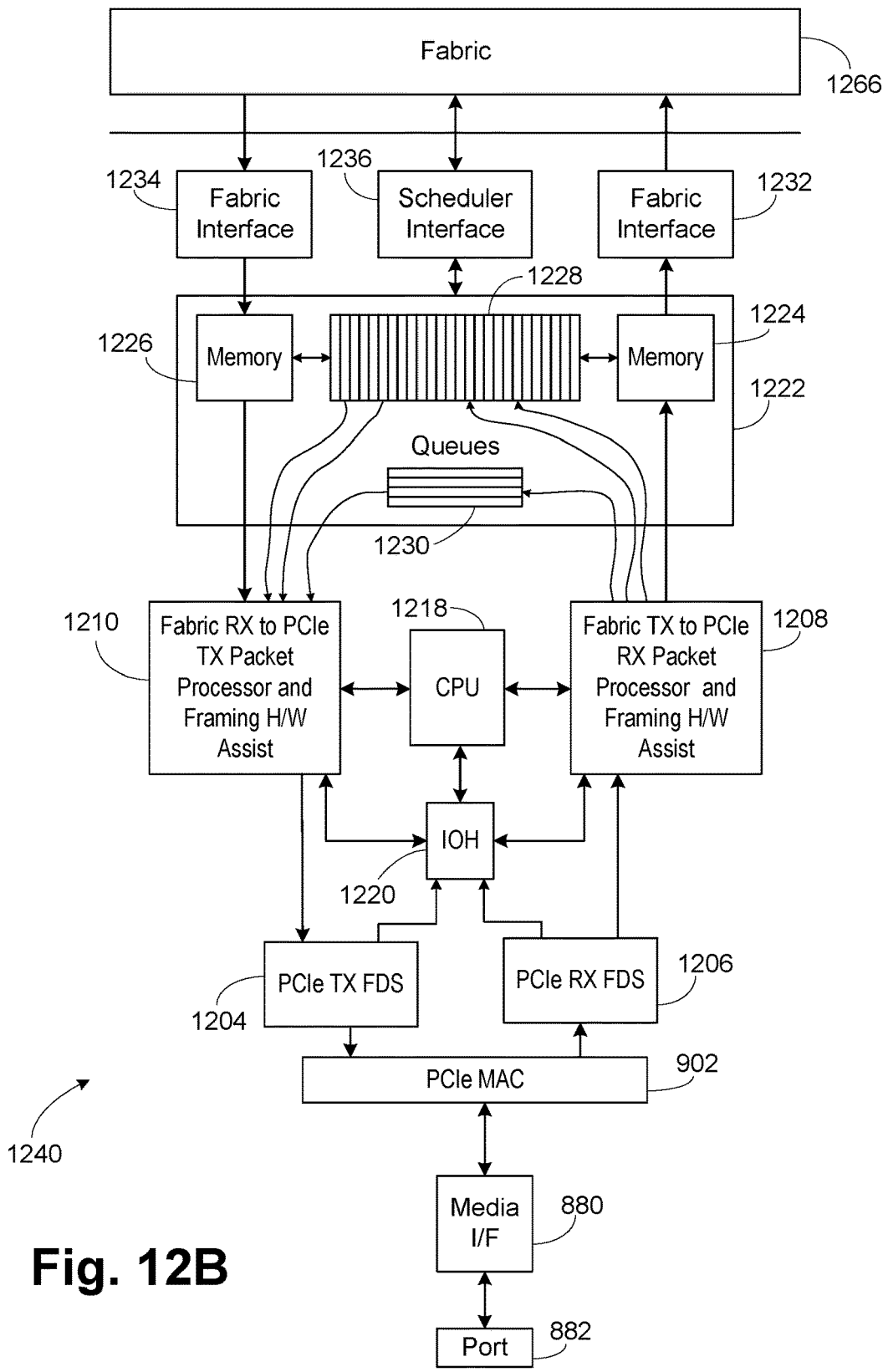
FIG. 12B is a block diagram of a port for the switch of FIG. 12A.

The above has been a description of a FC switch and a PCIe port for that switch. FIGS. 12A and 12B are an Ethernet-based embodiment of a switch 1200 and a PCIe port 1240. PCIe port controllers 1262, each of which contains a number of PCIe ports 1240, is connected to a crossbar fabric 1266. Similarly, Ethernet port controllers 1264 are connected to the crossbar fabric 1266. The Ethernet port controllers 1264 are conventional and not further discussed. A processor complex 1280 is present for normal configuration and management purposes. The processor complex 1280 includes a control processor 1290, RAM 1270, flash 1265, Ethernet PHY 1285 and serial interface 1275 are present as in the FC switch embodiment.

An exemplary PCIe port 1240 includes a port 882, media interface 880 and PCIe MAC 902, as in the PCIe port 900. A PCIe receive FDS 1206 and PCIe transmit FDS 1204 are connected to the PCIe MAC 902 as FIFOs. An IOH 1220 and CPU 1218 are present to monitor transactions and maintain the context table as in the PCIe port 900. A fabric transmit to PCIe receive packet processor and framing hardware assist 1208 receives packets from the receive FDS 1206. The packet processor and framing hardware assist 1208 performs the header development based on the context table in the IOH 1220 under the control of the CPU 1218 and then performs conventional packet processor operations. Preferably the context table also includes information relating to the flows, such as QoS and the like, and other information on the packet, allowing the packet to be provided directly from the packet processor and framing hardware assist 1208 to queues 1228 and 1230 in a memory block 1222 through a memory 1224. The queues 1228 are present to hold and receive packets from other ports. Queues 1230 are present for packets received at and being transmitted back out the port 1240. The queues 1228 and 1230 allow direct mapping between buffers in host memory and the queues 1228 and 1230 if desired. Packets coming from the fabric 1266 are provided to a memory 1226 in the memory block 1222 and then to the queues 1228. Packets are provided from the queues 1228 and memory 1226 to a fabric receive to PCIe transmit packet processor and framing hardware assist 1210. The packet processor and framing hardware assist 1210 performs the header conversion for the Ethernet to PCIe transfer and other conventional egress packet processor functions, in conjunction with the IOH 1220 and the control of the CPU 1218.

Fabric interfaces 1234 and 1232 connect the memory block 1222 to the fabric 1266 under control of a scheduler interface 1236.

The queues 1228 preferably conform with the other queues used in the switch 1200 and conventional Ethernet switches to allow better integration end-to-end and improved QoS and the like.

One focus of the above discussion has been the maximum speeds that can be provided by PCIe links. While that can be an advantage in many cases, in others it is not needed. In such a case, fewer PCIe lanes can be used to form the link. The above high speed discussions have been based on using 16 lanes, the common maximum. If only 25 Gb/s of bandwidth is actually needed, then four PCIe 3.0 lanes will suffice. This reduction in lanes allows either cheaper devices, as fewer hardware is needed for the fewer lanes, or larger fanout to more devices for an equal number of lanes.

FIG. 10A shows a conventional software stack of a host 100 according to the prior art. A SCSI layer 1002 is provided to interface to the operating system (not shown) and work with packets provided in buffers 1050 in host memory 1052. The packets are placed in the buffers 1050 or removed from the buffers 1050 by the application that is performing the read and write operations to the remote device. The SCSI layer 1002 develops the SCSI CDB and properly places it in position in the packet buffer to build a SCSI packet for read and write operations. Below the SCSI layer 1002 in this FC example is an FCP layer 1004. The FCP layer 1004 performs the FCP control and command operations, such as developing FCP command packets for read and write operations and the like. The SCSI layer 1002 and the FCP layer 1004 are the relevant network protocol stack in this example. Below the FCP layer 1004 is an HBA driver 1006. The HBA driver 1006 handles all of the necessary operations to control an HBA and interface to the FCP layer 1006. As HBAs, such as HBA 1008 are usually connected to the processor using a PCIe link, the HBA driver 1006 must also include a PCIe driver 1010 to control the actual PCIe hardware 1012 to manage the transmission and reception of PCIe packets. The PCIe hardware 1012 is connected to the HBA 1008, which includes similar PCIe hardware internally. The PCIe driver 1010 interacts with queue pairs 1054 typically used with PCIe hardware to place desired commands in the queue pairs 1054 to cause the data operations to occur. The commands placed in the queue pairs 1054 include the host memory address of the related packet buffer 1050.

FIG. 10B shows the contrasting software stack according to the present invention. The SCSI layer 1002 and the FCP layer 1004 are still present, but below them is a SCSI assist driver 1020. This SCSI assist driver 1020 handles various software functions used to control SCSI operations formerly performed in the HBA or the HBA driver. A new primary function of the SCSI assist driver 1020 is to develop and maintain the context able present in the PCIe port of the switch 450. This involves defining the PCIe addresses to be used for a given flow and the related FC or Ethernet addresses, priority and other header information. A primary transferred HBA function is the correlation of the SCSI devices to the FC or Ethernet devices and their relevant address and the like. An additional HBA function is the placement of commands in the queue pairs 1054 for use by the PCIe driver 1010 and the PCIe hardware 1012.

I/O error handling that is done currently in HBA firmware can be offloaded to host in a separate module or can preferably be integrated into the SCSI assist driver 1020. This way the CPU on the HBA and associated firmware functions are generally moved to the host using the SCSI assist driver 1020 to complement the hardware portion of the HBA effectively moved to the switch.

Below the SCSI assist driver 1020 is the PCIe driver 1010, used to control the PCIe hardware 1012 connected to the switch 450 as described above. As can be seen, this is a lighter stack which improves latency of operations.

Figure 10C:
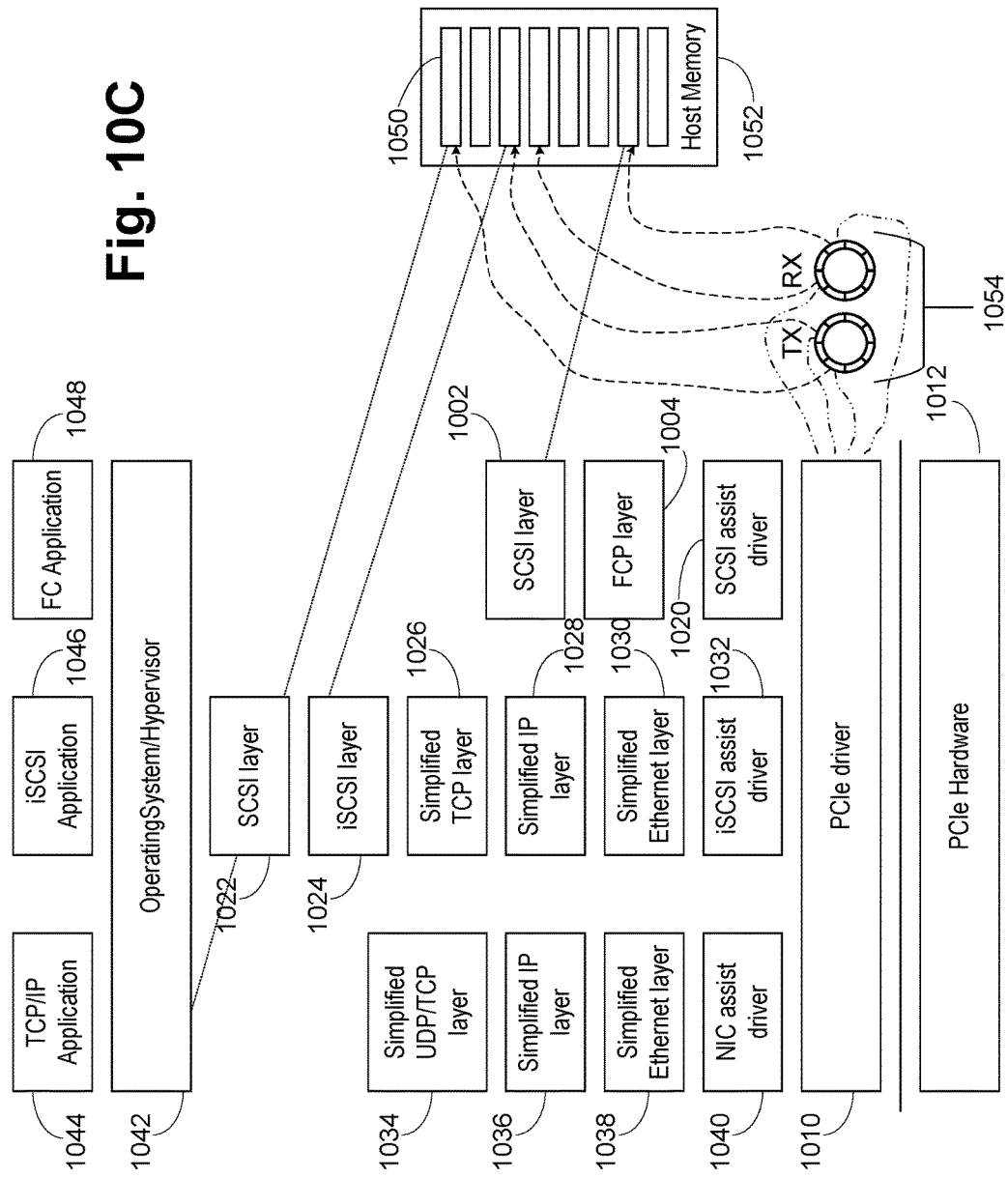
FIG. 10C is a second embodiment of a software stack of a host according to the present invention.

FIG. 10C is a software stack illustration of multiple protocols using a single PCIe port. In addition to the FC stack of FIG. 10B, and iSCSI stack and a conventional Ethernet TCP/IP stack are shown. A TCP/IP application 1044, an iSCSI application 1046 and an FC application 1048 are executing in VMs on a hypervisor 1042. The hypervisor 1042 provides FC commands from the FC application 1048 to the SCSI layer 1002. iSCSI requests are provided to a SCSI layer 1022. The SCSI layer 1022 provides commands to a simplified TCP layer 1026. The TCP layer 1026 is simplified, as it only needs to perform error handling and recovery and various control and management functions, such as TCP port setup and providing context table information, as the packet header development is done in the PCIe port using context table information. Effectively the simplified TCP layer 1026 is bypassed for normal fast path data traffic and the like. The simplified TCP layer 1026 provides commands to a simplified IP layer 1028. The IP layer 1028 is simplified in the same manner as the TCP layer. The simplified IP layer 1028 provides commands to a simplified Ethernet layer 1030. The Ethernet layer 1030 is simplified in the same manner as the TCP layer. The simplified Ethernet layer 1030 provides commands to an iSCSI assist driver 1032. The iSCSI assist driver 1032 performs much like the operation of the SCSI assist driver 1020 by working with the PCIe port and the context table. Conventional TCP/IP-based requests from the TCP/IP application 1044 are provided by the hypervisor 1042 to a simplified UDP/TCP layer 1034. The UDP/TCP layer 1034 is simplified, as it only needs to perform error handling and recovery and various control and management functions, such as TCP or UDP port setup and providing context table information, as the packet header development is done in the PCIe port using context table information. Effectively the simplified UDP/TCP layer 1034 is bypassed for normal fast path data traffic and the like. The simplified UDP/TCP layer 1034 provides commands to a simplified IP layer 1036. The IP layer 1036 is simplified in the same manner as the TCP layer. The simplified IP layer 1036 provides commands to a simplified Ethernet layer 1038. The Ethernet layer 1038 is simplified in the same manner as the TCP layer. The simplified Ethernet layer 1038 provides commands to a NIC assist driver 1040. The NIC assist driver 1040 is similar to the SCSI assist driver 1020 and the iSCSI assist driver 1032. Each of the SCSI assist driver 1020, iSCSI assist driver 1032 and the NIC assist driver 1040 interact with the PCIe driver 1010, which, as before, interacts with the command queues 1054 and the PCIe hardware 1012. The PCIe port will be able to provide the proper headers and the like based on the PCIe address in the PCIe packets and the protocol indication in the context table, as discussed above.

The above discussion has focused on describing the operation of a single PCIe link to a switch and the switch operation. To provide for the redundancy normally provided by an HBA having two ports, PCIe links can be developed from two different roots in the processor, with two different PCIe retimers or a dual channel PCIe retimer. For the embodiment of FIG. 6, one link from each root goes to each PCIe fabric switch 640, thus easily providing redundancy. The two PCIe links from each host or host chassis can then go to different switches 450 present at the TOR to continue the redundancy to the SAN fabrics or LANs. Alternatively, the dual PCIe roots can be used for load balancing.

In a typical datacenter, the hosts are running a virtualized environment. The host is executing a hypervisor, such as VMware™, Hyper-V™, Xen™ and the like. On top of the hypervisor are often numerous virtual machines (VMs). The VMs are the actual applications that are running on the hosts. The hypervisor includes a virtual switch to both handle the external communications of the VMs but also the communications between applications on the VMs on that particular host. The VMs connect to the vswitch using virtual NICs. Because it is a virtual switch, all of the packet header analysis and routing table lookups and the like must be performed by the host processor as software tasks. While modern processors are extremely fast, the sheer scale of the tasks to performed relatively slow, especially as compared to the dedicated hardware present in a physical switch. As the virtual switch is based on the use of buffers in memory, this cooperates nicely with PCIe queue pairs as discussed above, so that the virtual switch can be easily integrated into the physical switch by configuring the queue pairs, and even potentially be replaced in many cases. As the physical switch has hardware routing capabilities in the switch ASIC, this hardware routing, which is much faster than the routing operations in the virtual switch, can be used to assist the hypervisor in its virtual switch operations. As the vswitches are Ethernet switches, the Ethernet packet, less headers and the like, in the buffer is referenced in the transmit queue pair and provided to the switch 450. The switch 450 then forms the full Ethernet packet based on the context table information, which is then routed by the routing hardware in the switch 450. If the packet is to go to an external location, it just exits the switch 450 in a normal manner. If the packet is for internal use by another VM, the Ethernet packet is then routed back to the PCIe port, where it will be converted back to PCIe format. Thus, there are the normal two entries in the context table, one for each virtual port. The context entries for the virtual ports would include a bit to indicate that it is acceptable to route the packet back to the port from which it was received. In a normal course the context entries for the VMs would be setup once, not on a per flow creation basis, so context setup time would be nominal and not involved in normal data traffic. Because of the very high speed of the routing hardware and low latency of the PCIe connection, in most cases this use of the PCIe connection and the switch 450 will actually be faster than having the hypervisor execute the vswitch. As the input and output of the process are the same packets in packet buffers that would have been present in the vswitch case, the hardware operation would be transparent to the remaining portions of the hypervisor and to the VMs.

The above substitution of the physical switch 452 for the vswitch has focused on routing of packets, but other services provided by a switch, such as access control lists (ACLs) and virtual tunnel endpoints (VTEPs), can be performed as well, again at a time savings to the virtual implementation by the hypervisor.

Further, while the above discussion has focused in VMs, operations are similar if containers are used instead of VMs.

To aid in the better understanding of the invention, it believed that a description of a write operation is considered helpful. Initially the application in the host 500 develops the packet payload in a buffer 1050 in host memory 1052. When the packet payload is complete, the host 500 provides the write command to the SCSI layer 1002. The SCSI layer 1002 develops the SCSI CDB and provides it and the packet buffer location to the FCP layer 1004. The FCP layer develops an FCP Write operation, which is an FCP_CMND information unit (IU) containing the desired logical unit number (LUN); the SCSI CDB; a read or write bit, in this case a bit indicating a write; and the length of the data transfer. This IU is provided to the SCSI assist driver 1020. The SCSI assist driver 1020 determines the needed FC addresses based on the CDB and the LUN and the desired PCIe address and provides a PCIe message packet to the PCIe driver 1010 to cause the flow to be entered into the context table in the PCIe port. The PCIe driver 1010 places the PCIe message packet into a packet buffer 1050 and places an entry in the transmit queue of the queue pair 1054. The PCIe hardware 1012 retrieves the command from the queue pair 1054, obtains the PCIe message packet and transfers the PCIe message packet to the PCIe port 452. As this is a PCIe message packet, it is provided to the CPUs 918 in the PCIe port 452 to allow the CPUs 918 to set up the context table entries for the flow. When the context table is setup, the FCP_CMND packet is provided to the address specified in the context information. This is done by the SCSI assist driver 1020 providing the FCP_CMND packet to the PCIe driver 1010, which places the FCP_CMND packet in a packet buffer 1050 and a command into the transmit queue. The PCIe hardware 1012 then retrieves the FCP_CMND packet and provides it the PCIe port 452 as a PCIe memory transaction, as this packet is a normal data packet for PCIe and not a special configuration or management packet. The PCIe port 452 places the FCP_CMND PCIe packet into the PCIe RX FDS 906. The FCP_CMND packet is then run through the framing hardware assist 908 to have the FCP_CMND packet sent to the intended target device as a normal network protocol packet.

When the target is ready for the data transfer, the target provides an FCP_XFER_RDY IU packet to the host. The FC packet that is the FCP_XFER_RDY is routed to the PCIE port 452. The framing assist hardware 910 performs a context table lookup, finds the entry for the host and adds the Completer ID and RXID to the context table. The framing assist hardware 910 strips the FC header and builds the PCIe header based on the context table entry. The PCIe memory transaction packet is then provided to the TX FDS 904, to the PCIe Mac 902 and then out of the port 882. The FCP_XFER_RDY PCIe packet is received at the PCIe hardware 1012 and placed in a packet buffer 1050 in host memory 1052. Further, a command is placed in the receive queue of the queue pair 1054. The PCIe driver 1010 detects the new command in the receive queue and provides it to the SCSI assist driver 1020. The SCSI assist driver 1020 notes the Completer ID and the RXID to maintain a complete copy of the context information and passes the command indication to the FCP layer 1004, which examines the packet in the packet buffer 1050 and determines that it is the needed XFER_RDY. The FCP layer 1004 then develops the FCP_DATA IU that is the actual data write operation. The FCP_DATA_IU and packet buffer 1050 address are provided to the SCSI assist driver 1020. Because the context table is setup, the SCSI assist driver 1020 simply passes the information to the PCIe driver 1010. The PCIe driver 1010 places a command in the transmit queue indicating the write data operation and the packet buffer 1050 address. The PCIe hardware 1012 retrieves the command and performs the data transfer, developing PCIe memory transaction packets as necessary until the entire data transfer is completed. The PCIe packets are received at the PCIe port 452. The PCIe packets are provided to the framing hardware assist 908. The framing hardware assist 908 determines there is a context table entry based on the PCIe address, strips the PCIe header and builds the FC header. The FC packet is then provide to the FC TX FDS 912 to be provided out of the port to the switch core.

Ultimately, the data write operation completes and the target provides an FCP_RSP IU. As with the FCP_XFER_RDY IU, the packet goes through the framing hardware assist 910 and then to the PCIe hardware 1012. The PCIe hardware 1012 places the PCIe packet in a packet buffer 1050 and provides a command to the receive queue. The PCIe driver 1010 retrieves the command from the receive queue and provides it to the SCSI assist driver 1020. The SCSI assist driver 1020 detects that the command is a successful FCP_RSP IU and passes the command indication to the FCP layer 1004. The FCP layer 1004 retrieves the FCP_RSP packet from the packet buffer 1050 and passes a completion message to the SCSI layer 102, which then informs the host of the successful completion of the write operation.

In addition to passing the FCP_RSP IU to the FCP layer 1004, the SCSI assist driver 1020 develops a PCIe message to be provided to the CPUs 918 to indicate that the context entry can be removed. This PCIe message is delivered to the PCIe driver 1010, which places it in a packet buffer 1050 and provides a command to the transmit queue. The command is retrieved by the PCIe hardware 1012 and reaches the port 888. As it is a PCIe message, the PCIe message is provided to the CPUs 918. The CPUs 918 determine that the message is a context entry removal message and the indicated context entry is removed from the context table. With this the operation of the write operation is complete.

This has been an explanation of a simple write operation. With this explanation and the description provided above, read operations and more complicated operations can readily be understood and developed by one skilled in the art.

While the above description has focused on SCSI transfers using FCP, equal benefits are obtained with other protocol stacks such as those used in Ethernet transfers, such as UDP, IP, TCP/IP and the like; FC-NVMe instead of FCP; and the like. Indeed, protocols utilizing remote direct memory access (RDMA) or similar protocols such as Non-Volatile Memory Express (NVMe) are particularly suitable as the PCIe queues discussed above map directly to host memory structures used in RDMA and NVMe. Indeed, for RDMA and NVME and similar protocols, because the PCIe queues are just memory structures, the normal software stack can be reduced to a simple operating system network service. The network protocol stack was described for Fibre Channel as being the SCSI layer and the FCP layer. This is appropriate for Fibre Channel, as it is a storage protocol. For an iSCSI transfer, the network protocol stack would include the SCSI layer, an iSCSI layer, a TCP layer, an IP layer and potentially an IPSEC layer. For a normal Ethernet transaction, the network protocol stack would include the TCP layer, the IP layer and the IPSEC layer if used. Thus the actual items in the network protocol stack vary based on the data use and the network protocol.

To summarize, according to the present invention, the hardware from the HBA or NIC that is required to convert from the packets on the PCIe link to FC or Ethernet packets is moved to the port at a switch, with various software portions retained as a driver on the host. This allows the HBA or NIC to be completely removed from the host, saving both cost and space. This space saving can be used to provide additional processors and memory in the freed up space, further increasing compute density, which is very desirable in cloud and datacenter applications. Removing the HBA or NIC can usually be accompanied by removing any PCIe switch present on the host board that had been used for PCIe fanout. Current server or host processors include multiple PCIe root complexes, so redundancy can be maintained by using different root complexes instead of redundant HBAs or NICs, further improving the cost and space savings.

Removing both the PCIe switch and the HBA or NIC reduces latency significantly, both at a hardware level and a software level. The inclusion of the HBA or NIC functions in the switch ASIC adds back much less latency than present in the HBA or NIC due to improved speed and density and greatly reduced gate count. The simplifying of the driver stack provides reduced software latency.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

the invention claimed is:

1. A switch comprising:
   a switch processor;
   a memory coupled to the processor for storing programs to cause the switch processor to perform various methods;
   a plurality of network ports for transferring network protocol packets and for connection to a network or a fabric, each of the network ports complying with a network protocol selected from at least one of Ethernet, Fibre Channel or Infiniband;
   a plurality of Peripheral Component Interconnect Express (PCIe) ports for transferring PCIe packets and for connection to a host computer and for mapping PCIe packets to network protocol packets based on context information; and
   a switching mechanism interconnecting the plurality of network ports and the plurality of PCIe ports,
   wherein each PCIe port includes:
      a port connection to receive a connection from the host computer;
      a switching connection connected to the switching mechanism;
      a context table;
      receive framing assist hardware coupled to the context table, the port connection and the switching connection to replace PCIe headers in PCIe packets received through the port connection with network protocol headers for provision as network protocol packets through the switching connection according to values contained in the context table; and
      transmit framing assist hardware coupled to the context table, the port connection and the switching connection to replace network protocol headers in network protocol packets received through the switching connection with PCIe headers for provision as PCIe packets through the port connection according to values contained in the context table.

2. The switch of claim 1, wherein each PCIe port further includes:
   a PCIe port processor coupled to the port connection and to the context table; and
   memory connected to the PCIe port processor for storing programs to cause the PCIe port processor to perform various methods,
   wherein the memory stores a program to cause the PCIe port processor to place received context information into the context table, the context information containing values to map between PCIe packets and network protocol packets.

3. The switch of claim 2, wherein the context information is received in a PCIe message packet.

4. The switch of claim 2, wherein the memory stores a program to cause the PCIe port processor to remove context information from the context table.

5. The switch of claim 1, wherein the plurality of network ports include network ports complying with at least two of Ethernet, Fibre Channel and Infiniband.

6. The switch of claim 5, wherein packets received at a single PCIe port are provided to a first network port complying with one of Ethernet, Fibre Channel or Infiniband and a second network port complying with a different one of Ethernet, Fibre Channel or Infiniband.

7. The switch of claim 1, wherein PCIe packets received at a PCIe port from the host computer are provided to the switching mechanism and returned to the same PCIe port for provision to the host computer as PCIe packets.

8. A host computer comprising:
a host processor;
host memory connected to the host processor for storing programs to cause the host processor to perform various methods and for forming a plurality of packet buffers; and
a Peripheral Component Interconnect Express (PCIe) root coupled to the host processor for connection to a PCIe port on a switch,
wherein the programs stored in the host memory include:
an application to provide or receive data packets, the application storing the data packets in packet buffers in the host memory;
a network protocol stack coupled to the application to cooperate with data in a packet buffer and the application to prepare a packet for transmission and to operate on a received packet;
a network protocol assist driver coupled to the network protocol stack to develop and provide context information for mapping a PCIe packet to a network protocol packet; and
a PCIe driver coupled to the network protocol assist driver and to the PCIe root to manage transmission and reception of PCIe packets by the PCIE root,
wherein the application performs read and write operations to a remote device connected to a network or fabric,
wherein the network protocol assist driver receives the read and write operations performed by the application and in response provides context information for the read or write operations, and
wherein the network protocol assist driver provides the read and write operations after providing the context information.

9. The host computer of claim 8, wherein the context information is provided in PCIe messages and the read and write operations are provided in PCIe memory transactions.

10. The host computer of claim 8, wherein the network protocol assist driver receives operation complete indications from the remote device after completion of the read and write operations and in response provides a request to delete the context information for the read and write operations, and
wherein the network protocol assist driver provides the operation complete indications to receipt by the application after providing the request to delete the context information.

11. The host computer of claim 8, wherein the programs stored in the host memory further include:
a hypervisor for managing virtual machines; and
at least two virtual machines which communicate with each other and with devices outside of the host computer, the virtual machines including virtual network protocol ports for providing and receiving network protocol packets,
wherein the network protocol stack, the network protocol assist driver and the PCIe driver are part of the hypervisor,
wherein there is an application associated with each virtual machine which provides and receives the network protocol packets for the respective virtual machine, and
wherein network protocol packets provided by a first virtual machine and received by a second virtual machine are provided to the network protocol stack, the network protocol assist driver, the PCIe driver and the PCIe root and received by the network protocol stack, the network protocol assist driver, the PCIe driver and the PCIe root.

12. A computer system comprising:
a switch comprising:
a switch processor;
a switch processor memory coupled to the processor for storing programs to cause the switch processor to perform various methods;
a plurality of network ports for transferring network protocol packets and for connection to a network or a fabric, each of the network ports complying with a network protocol selected from at least one of Ethernet, Fibre Channel or Infiniband;
a plurality of Peripheral Component Interconnect Express (PCIe) ports for transferring PCIe packets and for mapping PCIe packets to network protocol packets based on context information; and
a switching mechanism interconnecting the plurality of network ports and the plurality of PCIe ports; and.
a host computer comprising:
a host processor;
host memory connected to the host processor for storing programs to cause the host processor to perform various methods and for forming a plurality of packet buffers; and
a Peripheral Component Interconnect Express (PCIe) root coupled to the host processor and connected to a PCIe port on the switch,
wherein the programs stored in the host memory include:
an application to provide or receive data packets, the application storing the data packets in packet buffers in the host memory;
a network protocol stack coupled to the application to cooperate with data in a packet buffer and the application to prepare a packet for transmission and to operate on a received packet;
a network protocol assist driver coupled to the network protocol stack to develop and provide context information to PCIe ports for mapping a PCIe packet to a network protocol packet; and
a PCIe driver coupled to the network protocol assist driver and to the PCIe root to manage transmission and reception of PCIe packets by the PCIE root.

13. The computer system of claim 12, wherein each PCIe port includes:
a port connection to receive a connection from the host computer;
a switching connection connected to the switching mechanism;
a context table;
receive framing assist hardware coupled to the context table, the port connection and the switching connection to replace PCIe headers in PCIe packets received through the port connection with network protocol headers for provision as network protocol packets through the switching connection according to values contained in the context table; and transmit framing assist hardware coupled to the context table, the port connection and the switching connection to replace network protocol headers in network protocol packets received through the switching connection with PCIe headers for provision as PCIe packets through the port connection according to values contained in the context table.

14. The computer system of claim 13, wherein the application performs read and write operations to a remote device connected to a network or fabric, wherein the network protocol assist driver receives the read and write operations performed by the application and in response provides context information for the read or write operations, and wherein the network protocol assist driver provides the read and write operations after providing the context information.

15. The computer system of claim 13, wherein each PCIe port further includes:

a PCIe port processor coupled to the port connection and to the context table; and PCIe port processor memory connected to the PCIe port processor for storing programs to cause the PCIe port processor to perform various methods, wherein the PCIe port processor memory stores a program to cause the PCIe port processor to place received context information into the context table, the context information containing values to map between PCIe packets and network protocol packets.

16. The computer system of claim 15, wherein the network protocol assist driver receives operation complete indications from the remote device after completion of the read and write operations and in response provides a request to delete the context information for the read and write operations, wherein the network protocol assist driver provides the operation complete indications to receipt by the application after providing the request to delete the context information, and wherein the PCIe port memory stores a program to cause the PCIe port processor to remove context information from the context table.

17. The switch of claim 12, wherein packets received at a single PCIe port are provided to a first network port complying with one of Ethernet, Fibre Channel or Infiniband and a second network port complying with a different one of Ethernet, Fibre Channel or Infiniband.

18. The host computer of claim 12, wherein the programs stored in the host memory further include:

a hypervisor for managing virtual machines; and at least two virtual machines which communicate with each other and with devices outside of the host computer, the virtual machines including virtual network protocol ports for providing and receiving network protocol packets, wherein the network protocol stack, the network protocol assist driver and the PCIe driver are part of the hypervisor, wherein there is an application associated with each virtual machine which provides and receives the network protocol packets for the respective virtual machine, wherein network protocol packets provided by a first virtual machine and received by a second virtual machine are provided to the network protocol stack, the network protocol assist driver, the PCIe driver and the PCIe root and received by the network protocol stack, the network protocol assist driver, the PCIe driver and the PCIe root, and wherein PCIe packets received at a PCIe port from the host computer are provided to the switching mechanism and returned to the same PCIe port for provision to the host computer as PCIe packets.

* * * * *